US012721473B2

(12) United States Patent
Braun

(10) Patent No.: US 12,721,473 B2
(45) Date of Patent: Sep. 1, 2026

(54) AUTOMATED FOOD PATTY COOKING APPARATUS

(71) Applicant: Thomas Andrew Braun, Vancouver (CA)

(72) Inventor: Thomas Andrew Braun, Vancouver (CA)

(73) Assignee: Eat Robotics Inc., Sheridan, WY (US)

( * ) Notice: Subject to any disclaimer, the term of this patent is extended or adjusted under 35 U.S.C. 154(b) by 812 days.

(21) Appl. No.: 18/149,118

(22) Filed: Jan. 2, 2023

(65) Prior Publication Data

US 2024/0215757 A1 Jul. 4, 2024

(51) Int. Cl.

*A47J 37/04* (2006.01)
*A47J 37/06* (2006.01)
*A47J 37/12* (2006.01)

(52) U.S. Cl.

CPC ........... *A47J 37/043* (2013.01); *A47J 37/067* (2013.01); *A47J 37/1228* (2013.01)

(58) Field of Classification Search

CPC ...... A47J 37/043; A47J 37/044; A47J 37/046; A47J 37/067; A47J 37/0676; A47J 37/1228

See application file for complete search history.

(56) References Cited

U.S. PATENT DOCUMENTS

| | | | | |
|---|---|---|---|---|
| 3,739,712 A * | 6/1973 | Duning | ................. | A47J 37/044 99/427 |
| 2018/0035843 A1* | 2/2018 | Frehn | ....................... | H05B 6/12 |
| 2019/0320846 A1* | 10/2019 | Nevarez | ................ | A47J 37/044 |
| 2022/0300043 A1* | 9/2022 | Balsamo | ............... | G06F 1/1681 |
| 2023/0108903 A1* | 4/2023 | Brinkman | ............ | B25J 11/0045 99/334 |
| 2024/0000263 A1* | 1/2024 | Sevadjian | ........... | A47J 37/0682 |
| 2025/0127328 A1* | 4/2025 | Sevadjian | ........... | A47J 37/0682 |

* cited by examiner

*Primary Examiner* — Hung D Nguyen

(57) ABSTRACT

An automated food patty cooking apparatus comprising a horizontal rotating griddle with dividers which automatically fries hamburger/sandwich patties. A dispensing component loaded with various patties comprises horizontal trays stacked on top of one another that moves vertically up and down and dispenses a desired patty. The patties keep on rotating and after being cooked on one side, flipped over one by one and cooked on the opposite side using a flipper capable of moving either direction. After the patties are cooked, the flipper lifts them off the griddle and tilts them up, to slide them down a chute onto a conveyor belt or storage bin. The apparatus utilizes a real time Artificial Intelligence control module capable of predicting future demands, prepares patties in advance and optimizes cooking temperature, rotational speed, number of rotations, flipping action, and is fed orders electronically from customers online or from kiosks.

25 Claims, 11 Drawing Sheets

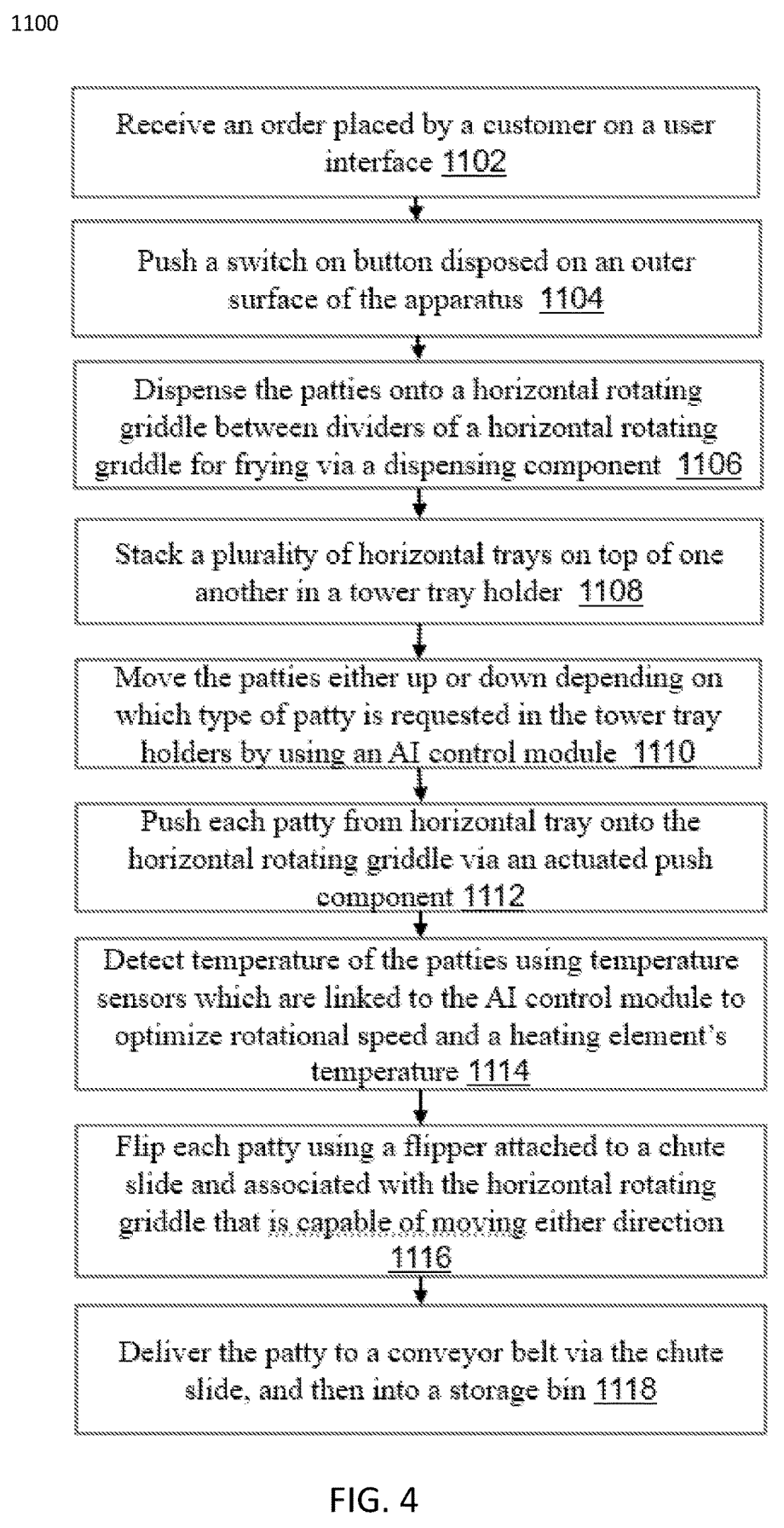

1100

Receive an order placed by a customer on a user interface 1102

Push a switch on button disposed on an outer surface of the apparatus 1104

Dispense the patties onto a horizontal rotating griddle between dividers of a horizontal rotating griddle for frying via a dispensing component 1106

Stack a plurality of horizontal trays on top of one another in a tower tray holder 1108

Move the patties either up or down depending on which type of patty is requested in the tower tray holders by using an AI control module 1110

Push each patty from horizontal tray onto the horizontal rotating griddle via an actuated push component 1112

Detect temperature of the patties using temperature sensors which are linked to the AI control module to optimize rotational speed and a heating element's temperature 1114

Flip each patty using a flipper attached to a chute slide and associated with the horizontal rotating griddle that is capable of moving either direction 1116

Deliver the patty to a conveyor belt via the chute slide, and then into a storage bin 1118

FIG. 4

AUTOMATED FOOD PATTY COOKING APPARATUS

CROSS-REFERENCE TO RELATED APPLICATION

This disclosure claims the benefit of the priority of U.S. Provisional Patent Application No. 63/384,388 entitled "Automated Food Patty Cooking Apparatus" and filed on Nov. 18, 2022. The above-identified application is incorporated herein by reference in its entirety.

BACKGROUND

Field of Invention

The present invention generally relates to a cooking apparatus, and more particularly, to an automatic food patty cooking and flipping apparatus that uniformly cooks the patty.

Description of Related Art

Hamburgers and similar sandwiches are popular home-cooked meals in many regions. Griddling is commonly used to prepare meat for use in hamburger preparation. Patties are typically fried on conventional griddles to ensure proper protein cooking and flavor development within the cooked meat. The flavors and textures created during the cooking process provide the consumer with a very palatable and desirable experience.

Traditional cooking methods, such as stovetop, ovens, steaming, and so on, take a long time to prepare. US20200357220A1 discloses an automatic food preparation line for automatically preparing bread products for making sandwiches or burgers comprises an automatic bread product handling system containing a plurality of different types of bread products, an automatic toaster appliance for toasting the bread products, an automatic packaging system for automatically dispensing both box and wrapping paper packaging. Further, US20190320846A1 discloses a cooking apparatus having a conveyor system having a continuous cooking surface and a dispenser disposed proximate to the continuous cooking surface. The apparatus cooks two sides at the same time.

The present invention is meant to be a replacement for manually operated griddles and grills. The most significant advantage is the labor savings over a manual rectangular griddle, which requires an employee to read orders, place the correct patties on the griddle, observe and flip them as needed, and then remove them from the griddle. Many media reports confirm that there is a shortage of 750,000 restaurant workers in the United States, and the minimum wage has been raised to $15 per hour in many states. This may lead to either an increase in prices of restaurant products or closure of restaurants due to lack of staff.

The current invention is also meant to be an alternative to much more expensive and complex robotic devices that cost tens of thousands of dollars or more and use robotic arms and numerous sensors to mimic humans. These complex devices may not survive in a greasy cooking environment without constant repairs. Simple stainless-steel appliances that are easy to maintain are more realistic and cost-effective.

The present invention ensures that the food patty is cooked to a high standard and uniformly without overcooking the patty. With the help of automation, perhaps one employee can run an entire takeout restaurant.

Accordingly, a need exists for an automated food patty cooking apparatus that addresses other needs, by one or more aspects of the present invention.

SUMMARY

The following is a summary description of illustrative embodiments of the invention. It is provided as a preface to assist those skilled in the art to more rapidly assimilate the detailed design discussion which ensues and is not intended in any way to limit the scope of the invention which are appended hereto in order to particularly point out the invention.

According to illustrative embodiments, the present disclosure focuses on an automated food patty cooking apparatus which partially overcomes the above-mentioned disadvantages or provides the users with a useful or commercial choice. It is a principal object of the present invention to provide an apparatus that successfully overcomes the deficiencies of the prior art.

According to an embodiment of the present invention an automated food patty cooking apparatus is disclosed. In one embodiment of the present invention, the apparatus includes a switch on and switch off button on the apparatus's housing. The apparatus includes at least four supporting elements for providing support to the housing when it is placed on the ground. The apparatus comprises a horizontal rotating griddle mounted on the housing. The apparatus comprises a horizontal rotating griddle with dividers that can be heated to automatically griddle hamburger/sandwich patties. The apparatus also includes a dispensing component that is attached to the horizontal rotating griddle and loaded with patties made from various meats, cheeseburgers, or vegan patties. The dispensing component dispenses frozen patties onto the griddle between the dividers of the horizontal rotating griddle for frying. The dispensing component is designed to hold a number of uncooked hamburger patties. The patty dispenser in a preferred embodiment of the present invention comprises horizontal trays stacked on top of one another in a tower tray holder. The apparatus also has tower tray holders for moving patties up and down. Each horizontal tray holds one patty that can move vertically up and down and dispense any type of patty.

Embodiments in accordance with the present invention provide that patties are placed one by one on the horizontal rotating griddle as it rotates in a circular motion. The rotation of the horizontal rotating griddle in one embodiment of the present invention may be timed so that one rotation is long enough to cook the patty on one side. Furthermore, after the patties have been rotated and cooked on one side, each patty is flipped over one by one using a flipper that can move in either direction via an adjustable component. In an embodiment of the present invention, the adjustable component may be associated with a chute slide and flipper. In an embodiment of the present invention, the flipper may be preset to flip the patties automatically at a preset time to the adjacent divider of the horizontal rotating griddle.

In an embodiment of the present invention, the dividers may be removable divider components. Each divider component may comprise a heating element that is controlled via the AI controlled module.

According to an embodiment of the present invention, after the patties have finished cooking, the flipper lifts them off the griddle and tilts them up, using gravitational forces to slide them down a chute onto the conveyor belt or, alternatively, into a storage bin for further use. In the embodiment, the flipper may automatically lift the patties and slide them down a chute slide when the patties are cooked properly. In an embodiment there may be a sensor as to when the flipper may move the patties to the chute slide.

In one embodiment of the present invention, the apparatus may include a touch screen with a user-friendly graphical user interface for controlling the apparatus. When a customer places an order, the user interface receives data from online orders and immediately dispenses patties onto the horizontal rotating griddle. In the embodiment, the apparatus may also use artificial intelligence based on historical data and other factors to predict high volume times in order to increase delivery speed by cooking patties ahead of high-volume orders being placed.

According to an embodiment of the present invention, the present invention discloses an apparatus that uses non-meat, frozen, or thawed patties. To deal with fluctuating demand and supply, the device employs artificial intelligence based on historical data and other factors. The apparatus is designed to automatically griddle hamburger/sandwich patties using a heated rotating griddle with a timed rotational cycle.

The apparatus may include infrared sensors to detect the final temperature of the patties to ensure they are thoroughly cooked. The temperature sensor can be linked to the AI system to optimize rotational speed and heating element temperature.

Embodiments in accordance with the present invention provide a process for automatically cooking a plurality of patties. The process including receiving an order placed by a customer on a user interface. The process also includes pushing a switch on button disposed on an outer surface of the apparatus. The process also includes dispensing patties onto a horizontal rotating griddle between dividers of a horizontal rotating griddle for frying via a dispensing component. The process also includes stacking a plurality of horizontal trays on top of one another in a tower tray holder. The process also includes moving the patties either up or down depending on which type of patty is requested in the tower tray holders by using an AI control module. The process also includes pushing each patty from horizontal tray onto the horizontal rotating griddle via an actuated push component. The process also includes detecting temperature of the patties using temperature sensors which are linked to the artificial intelligence (AI) control module to optimize rotational speed and a heating element's temperature. The process also includes flipping each patty using a flipper attached to a chute slide and associated with the horizontal rotating griddle that is capable of moving either direction. The process also includes delivering the patty to a conveyor belt via the chute slide, and then into a storage bin.

In one embodiment of the present invention, the process further comprises monitoring historical data and a plurality of factors using the artificial intelligence (AI) control module to predict high volume times in order to increase delivery speed by cooking patties ahead of high-volume orders being placed.

These and other advantages will be apparent from the present application of the embodiments described herein.

The preceding is a simplified summary to provide an understanding of some embodiments of the present invention. This summary is neither an extensive nor exhaustive overview of the present invention and its various embodiments. The summary presents selected concepts of the embodiments of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings, and wherein:

FIG. 4 illustrates a process for automatically cooking a plurality of patties, according to embodiments of the present invention disclosed herein.

Figures 1A, 1B:
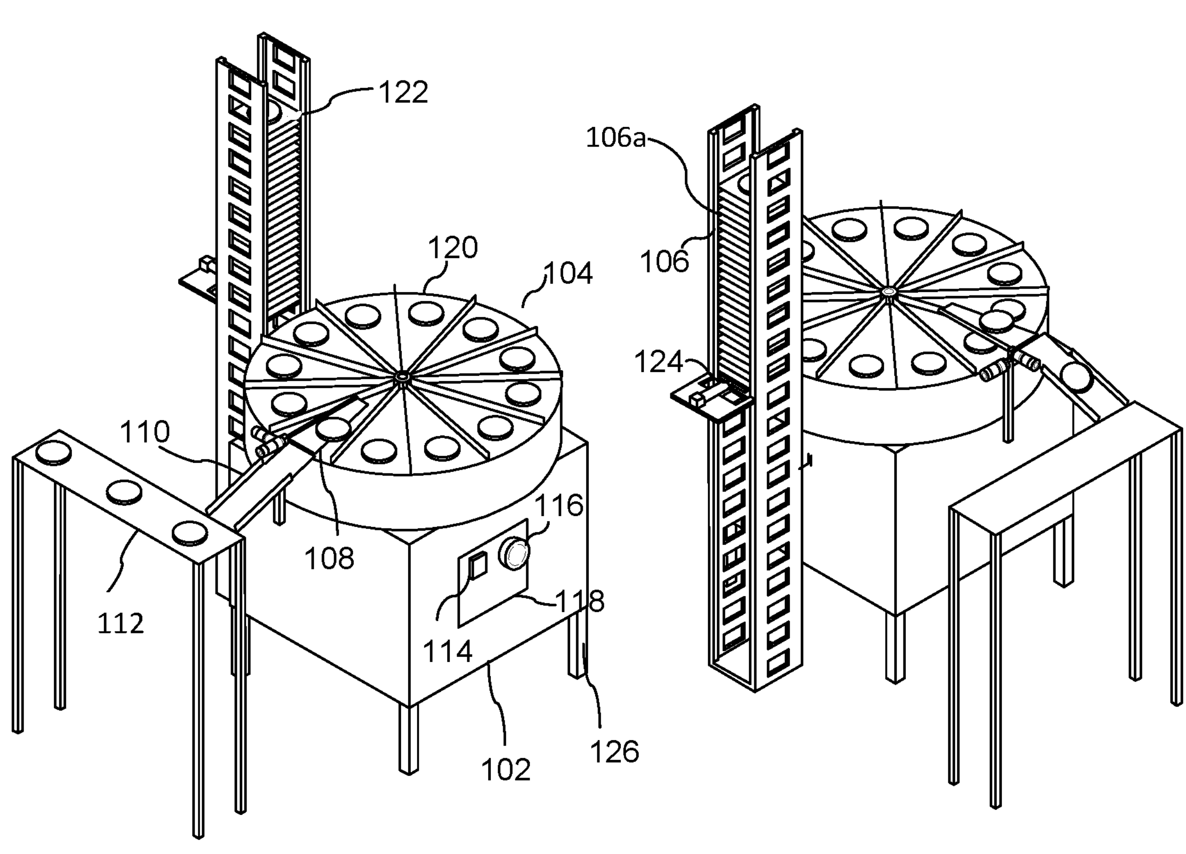
FIG. 1A illustrates a perspective view of an automated food patty cooking apparatus, according to embodiments of the present invention disclosed herein.
FIG. 1B illustrates a side view of an automated food patty cooking apparatus, according to embodiments of the present invention disclosed herein.

The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including but are not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

The following description includes the preferred best mode of one embodiment of the present invention. It will be clear from this description of the invention that the invention is not limited to these illustrated embodiments, but the invention also includes a variety of modifications and embodiments thereto. Therefore, the present description should be seen as illustrative and not limiting. While the invention is susceptible to various modifications and alternative constructions, it should be understood, that there is no intention to limit the invention to the specific form disclosed, but, on the contrary, the invention is to cover all modifications, alternative constructions, and equivalents falling within the scope of the invention.

In any embodiment described herein, the open-ended terms "comprising," "comprises," and the like (which are synonymous with "including," "having" and "characterized by") may be replaced by the respective partially closed phrases "consisting essentially of," "consists essentially of," and the like or the respective closed phrases "consisting of," "consists of", or the like.

As used herein, the singular forms "a", "an", and "the" designate both the singular and the plural, unless expressly stated to designate the singular only.

FIG. 1A to FIG. 1I illustrate various views of the automated food patty cooking apparatus 100, according to embodiments of the present invention. In specific reference to FIG. 1A to FIG. 1B, the automated food patty cooking apparatus 100 comprises a housing 102, a horizontal rotating griddle 104, a dispensing component 106, a flipper 108, a chute slide 110, a conveyor 112, and so forth.

The apparatus 100 in one embodiment of the present invention includes a switch on button 114 and switch off button 116 located on the apparatus's housing 102. The apparatus 100 includes at least four supporting elements 126 for providing support to the housing 102 when it is placed on the ground. The housing 102 may further comprise a touch screen 118 or tablet that may be used to control the apparatus 100 via a user-friendly graphical user interface.

The user interface receives data from online orders and immediately dispenses patties onto the horizontal rotating griddle 104 after a customer places an order. The switch off button 116 may be red color and switch on button 114 may be present within the user interface as green color.

Figure 3:
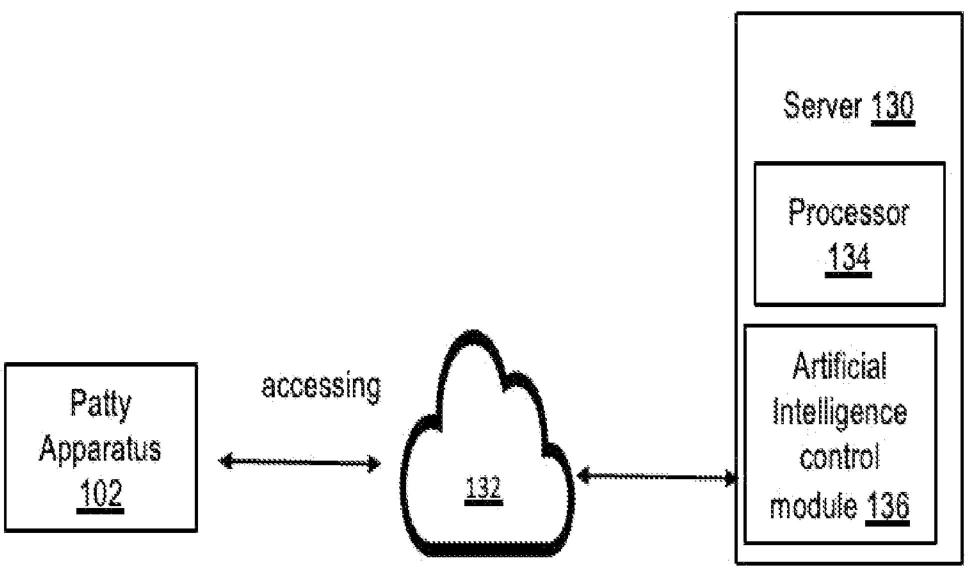
FIG. 3 illustrates a block diagram of an automated food patty cooking system, according to embodiments of the present invention disclosed herein.

The apparatus 100 may comprise the horizontal rotating griddle 104 mounted on the housing 102. The apparatus 102 may comprise the horizontal rotating griddle 104 with a plurality of dividers 120 that may be heated to automatically griddle hamburger/sandwich patties. In an embodiment the griddle 104 may be at same temperature throughout. In another embodiment, the griddle may have a plurality of cooking stations. Each of the plurality of cooking stations has its own heating element that is individually controlled by the AI control module 136 (as shown in FIG. 3). Furthermore, the plurality of dividers 120 can be used to assist in keeping chicken, beef and vegan patties from cross contamination by dedicating various stations for one type of patty. The AI control module 136 remembers which frying stations belongs to which type of food group if desired, and controls the temperature and rotational speed, and number of rotations required for each type of patty depending on size and composition.

Figure 1C:
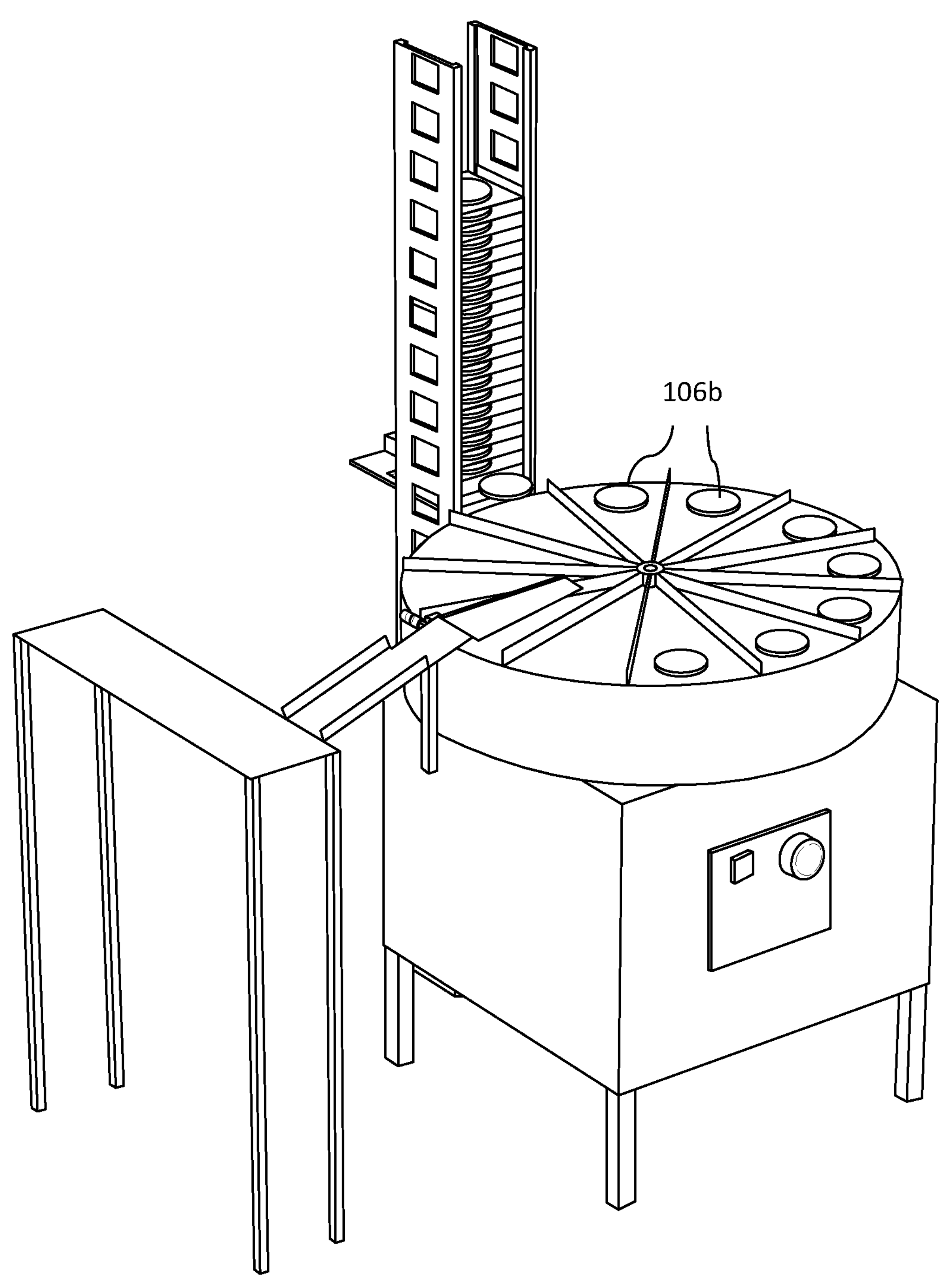
FIG. 1C illustrates a perspective view of an automated food patty cooking apparatus dispensing patties, according to embodiments of the present invention disclosed herein.

In an embodiment of the present invention, the dispensing component 106 may be attached to the horizontal rotating griddle 104 and loaded with patties made from various meats, cheeseburgers, or vegan patties. The dispensing component 106 may dispense patties onto the dividers 120 of the horizontal rotating griddle 104 for cooking, as seen in FIG. 1C. The dividers 120 may be removable divider components, each divider component comprise a heating element that is controlled via AI controlled module 136. The dividers 120 may be attached to a rotating axel at center, each divider component have a small protrusion at the end of the divider 120 which fits into a corresponding notch in a griddle surface of the griddle 104.

Figure 1D:
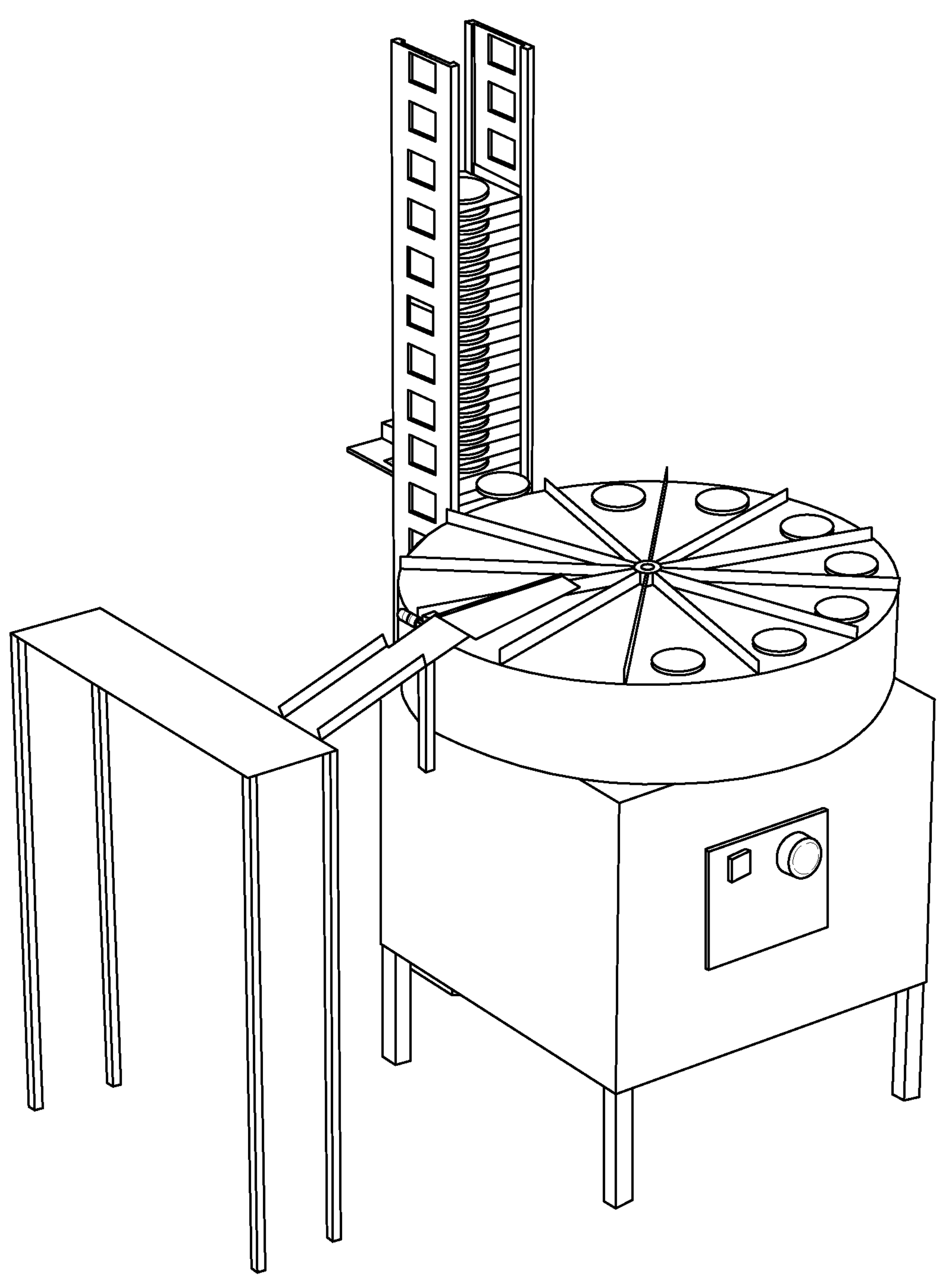
FIG. 1D illustrates a perspective view of an automated food patty cooking apparatus dispensing patties in timed rotational cycle, according to embodiments of the present invention disclosed herein.

In reference to the FIG. 1C-FIG. 1D, a plurality of patties 106*b* is dispended on the horizontal rotating griddle 104 by the dispensing component 106. The horizontal trays 106*a* are arranged vertically with a plurality of patties 106*b* in the plurality of horizontal trays 106*a*. In the embodiment the dispensing component 106 is equipped to dispense the patties from the lower end onto the horizontal rotating griddle 104. In the embodiment the movement of the trays in the dispensing device is towards the horizontal rotating griddle 104.

The dispensing component 106 is intended to hold a number of uncooked hamburger patties in a tower tray-holder 122 for moving patties either up or down depending on which type of patty is desired. In one of the embodiments of the present invention, the dispensing component 106 may comprise an actuated push component 124 for pushing the patty from horizontal tray 106*a* onto the horizontal rotating griddle 104.

In a preferred embodiment, the horizontal trays 106*a* of the dispensing component 106 are stacked on top of one another in the tower tray holder 122. Each horizontal tray 106*a* holds one patty that can move vertically up and down and dispense any type of patty.

According to embodiments of the present invention, the tower tray holder 122 can be heated to thaw frozen patties prior to being dispensed onto the horizontal rotating griddle 104. Each of the horizontal trays 106*a* present in the tower tray holder 122 can have a heating element to accelerate thawing.

In an alternative embodiment of the present invention, the tower tray holder 122 can be enclosed with a door on the back for access and insulated for refrigeration of the patties while they are being held in order to comply with various food safety regulations depending on the jurisdiction. Each divided space on the heating surface can have an individual heating element. The AI control module 136 can be adapted to optimize cooking for each patty individually depending on the type of patty optimizing the rotational speed of the griddle, the temperature of the patty dispensing tower, the temperature of each heating element, and the flipping action.

After each patty is cooked, a scrubbing arm (or other device) can be used to quickly clean the area and prepare it for the next patty. The apparatus 100 may comprise infrared sensors to detect the final temperature of the patties to ensure they are thoroughly cooked. The temperature sensor can be integrated with the AI system to optimize rotational speed and the temperature of the heating elements.

The patties are placed one by one on the horizontal rotating griddle 104 as it moves in a circular motion, as seen in FIG. 1D. In one embodiment of the present invention, the rotation of the horizontal rotating griddle 104 may be timed so that one rotation is long enough to cook a typical commercial hamburger patty on one side prior to being flipped. The cooking process would then be complete at the end of the second rotation when the flipper 108 moves the patty to the chute slide 110, and onto a conveyor belt 112 or, alternatively, into a storage bin, as seen in FIG. 1G. FIG. 1H and FIG. 1I. Thereafter, an actuated cleaning arm prepares the griddle for the next patty.

In an embodiment of the present invention, the system 100 comprises circular shaped trays all the way around the rotating griddle to catch drippings, in addition to the actuated scrubber and a small tray for the scrubber/scraper. The trays that extend all the way around the cooking surface are divided into four, each of which is a quarter circle, and about 3-4" wide and rests on metal brackets which hold them in place. In an embodiment of the present invention, a stainless-steel splash guard may be present on the back of the apparatus. This can be a riser which is 6-10" high to protect the wall and make cleaning easier.

For the patty tower cleaning, each patty can be on its own reusable tray which then goes into a dishwasher, or each shelf can have its own reusable removable tray which goes into the dishwasher for cleaning at the end of the day. Trays can be color coded to correspond to different food groups. The system 100 may further comprise splash guard and grease trays.

In an embodiment, the griddle 104 can cook one side of the patty in one rotation and then flip the patty to cook on the other side. A commercial burger patty can range from two ounces for a regular size fast food patty to four ounces for a premium sized patty. In the embodiment, the AI control module 136 configured to know which type of patty is dispensed on which location on the horizontal griddle 104. In the embodiment, the thicker patty could go around twice to be cooked on one side and then flipped while the regular size only needs one rotation per side. In another embodiment, the number of the rotations of the griddle for cooking a patty depends upon its size and thickness before being flipped to the second side for cooking and the AI control module 136 may be configured to determine the number of rotations or time before the patty is flipped to other side for cooking. In one embodiment the whole griddle is set to one temperature. In a preferred embodiment the speed of rotation, flipping and temperature of each individual divided space on the griddle could be adjusted and optimized by the AI system depending on the customer orders. In one of the preferred embodiments, a small 2 oz patty goes around twice (one each side) while the 4 oz patty stays on for a longer duration such as four rotations in total (two each side).

Figure 1E:
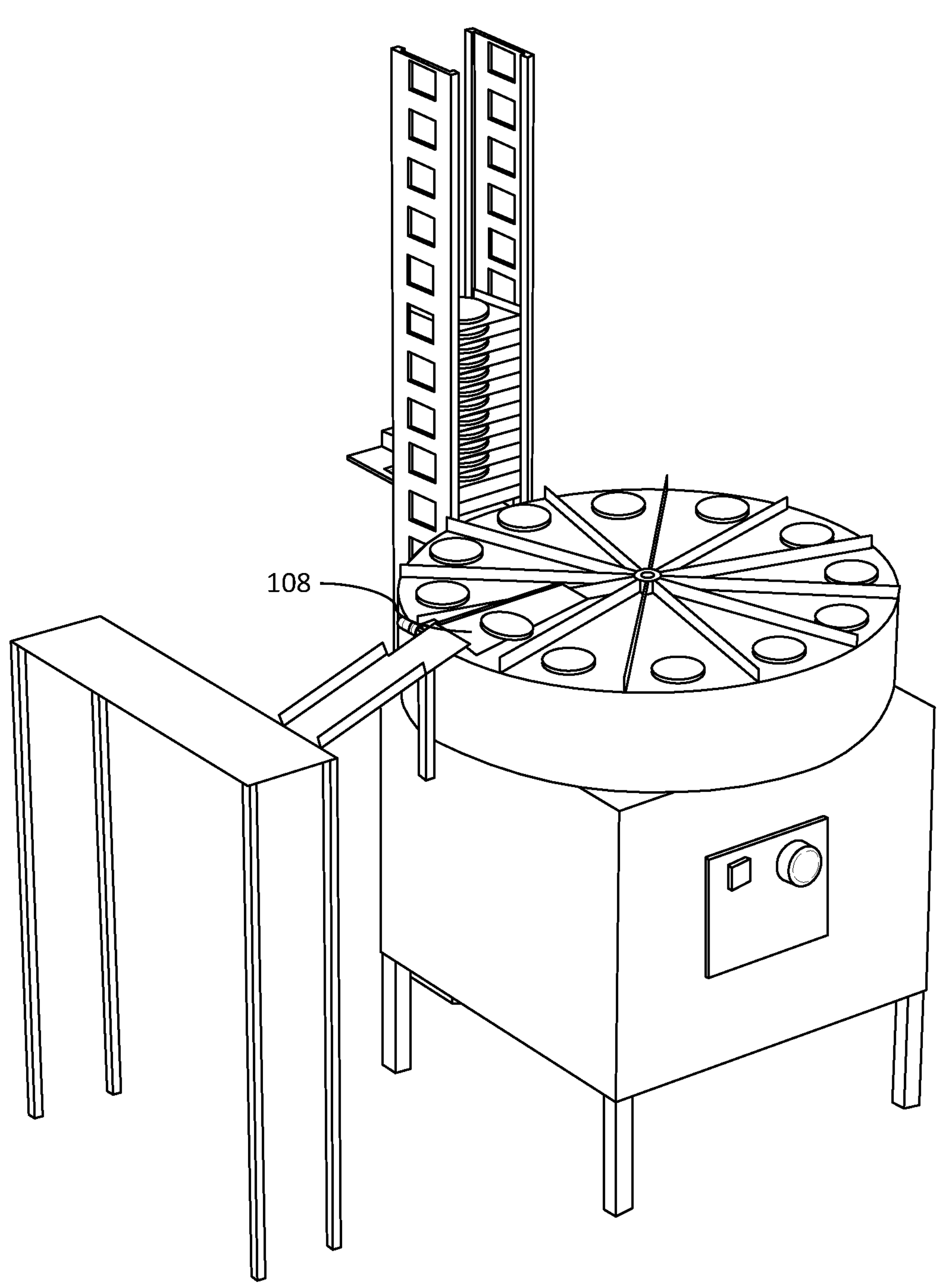
FIG. 1E illustrates a perspective view of an automated food patty cooking apparatus flipping over a patty after completion of cooking on one side, according to embodiments of the present invention disclosed herein.
Figure 1F:
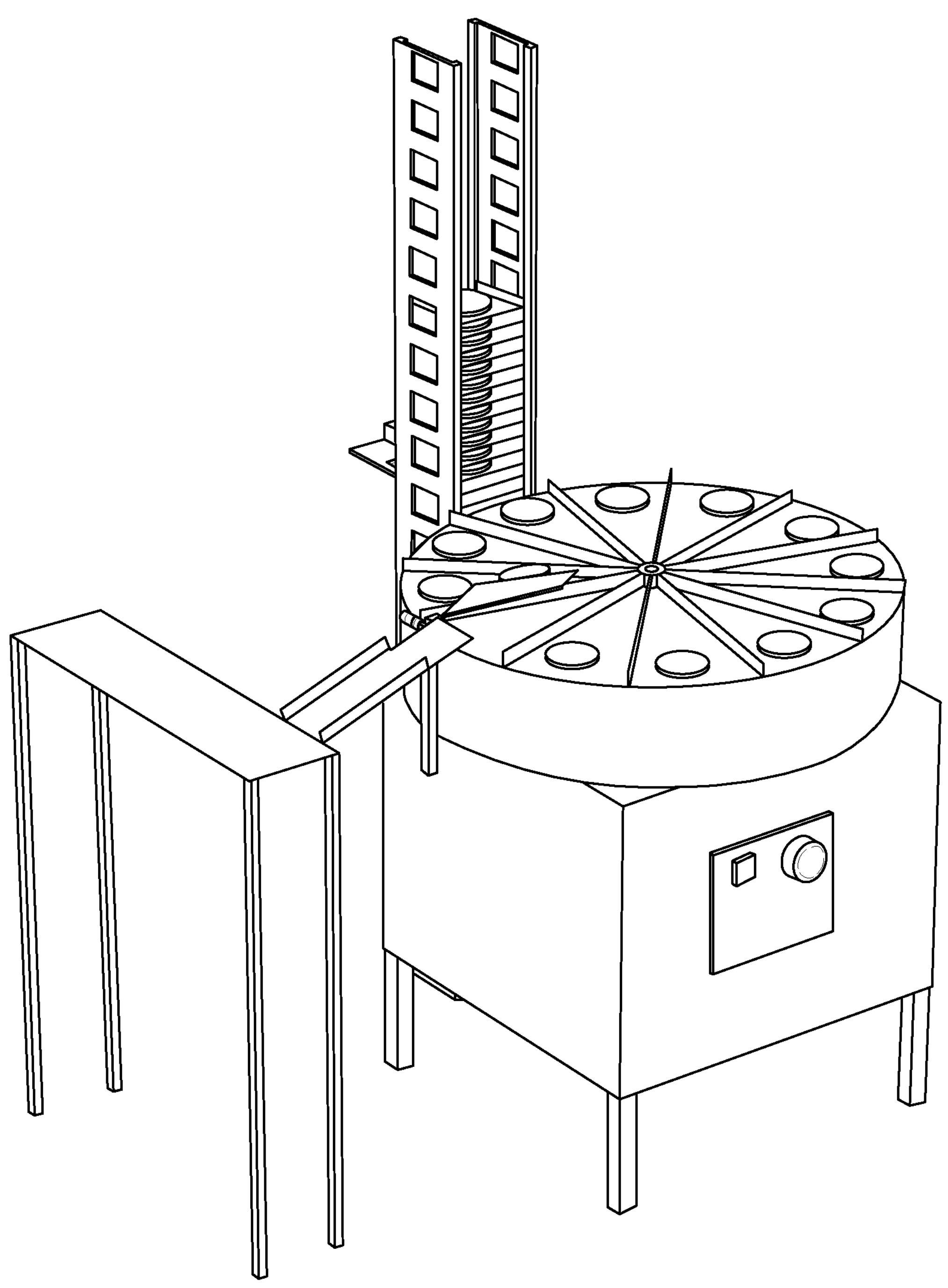
FIG. 1F illustrates another perspective view of an automated food patty cooking apparatus flipping over a patty, according to embodiments of the present invention disclosed herein.
Figure 1G:
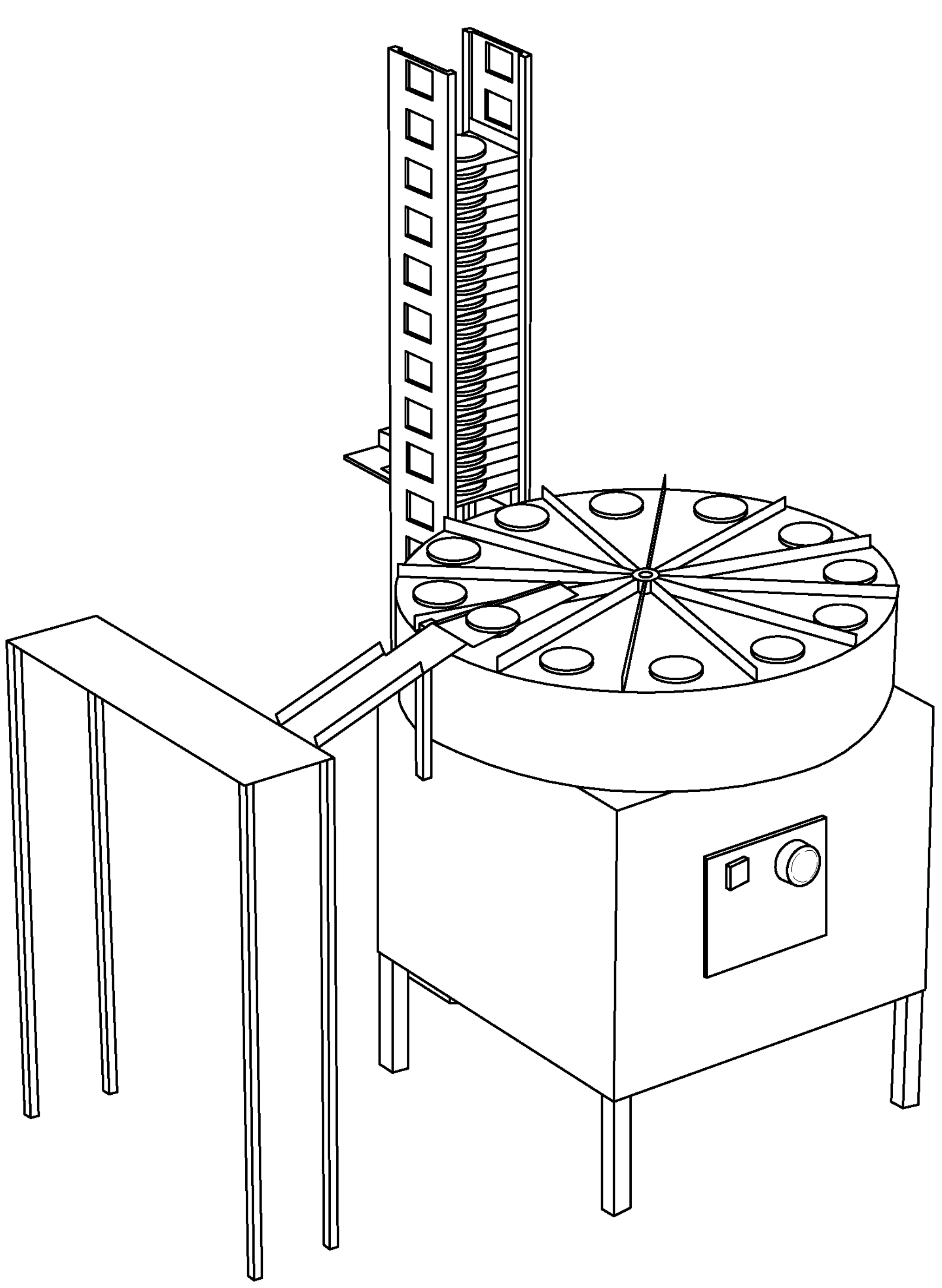
FIG. 1G illustrates a perspective view of an automated food patty cooking apparatus lifting off a patty by the flipper according to embodiments of the present invention disclosed herein.
Figure 1H:
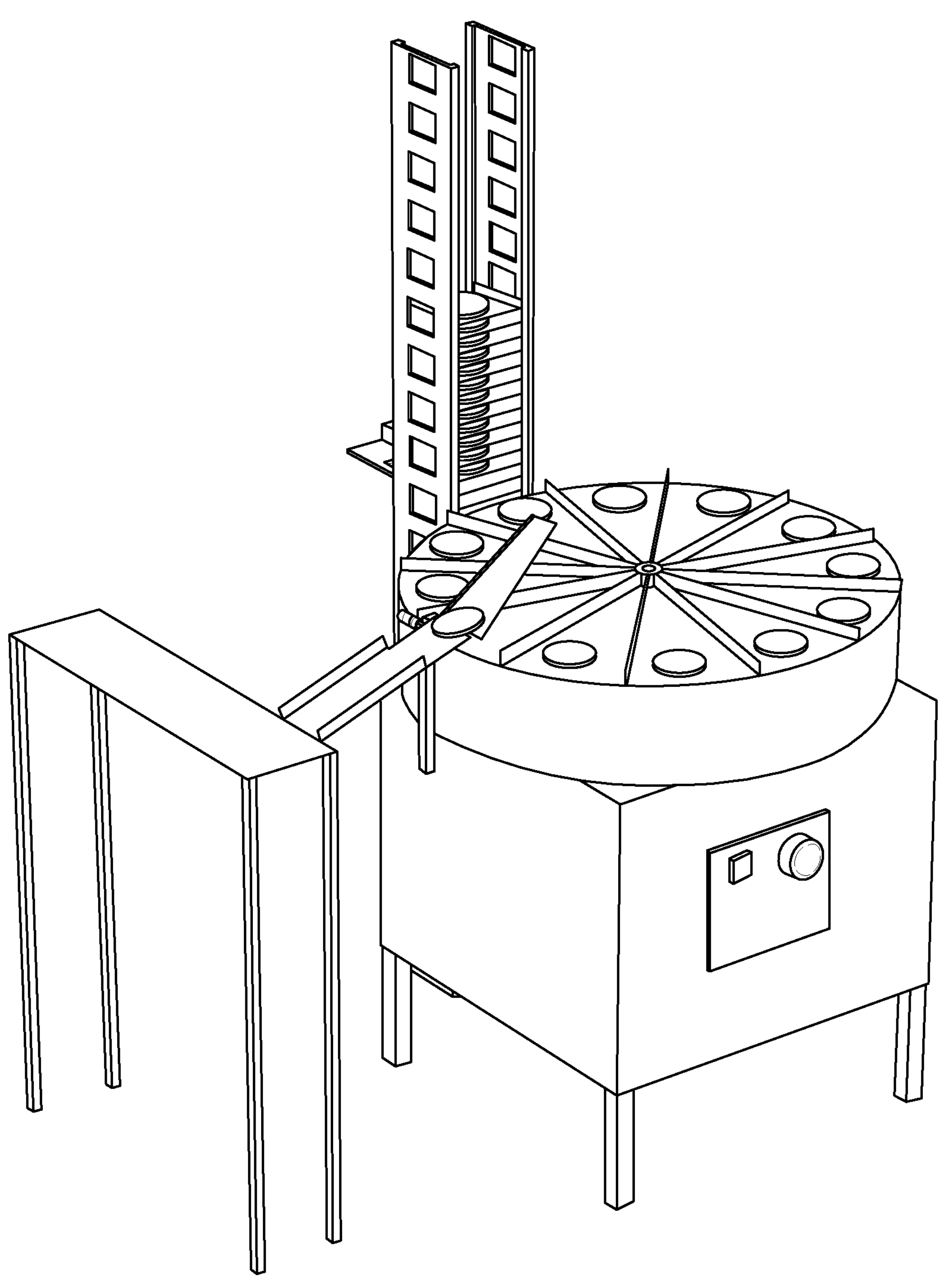
FIG. 1H illustrates a perspective view of an automated food patty cooking apparatus moves a patty down the chute slide according to embodiments of the present invention disclosed herein.
Figure 1I:
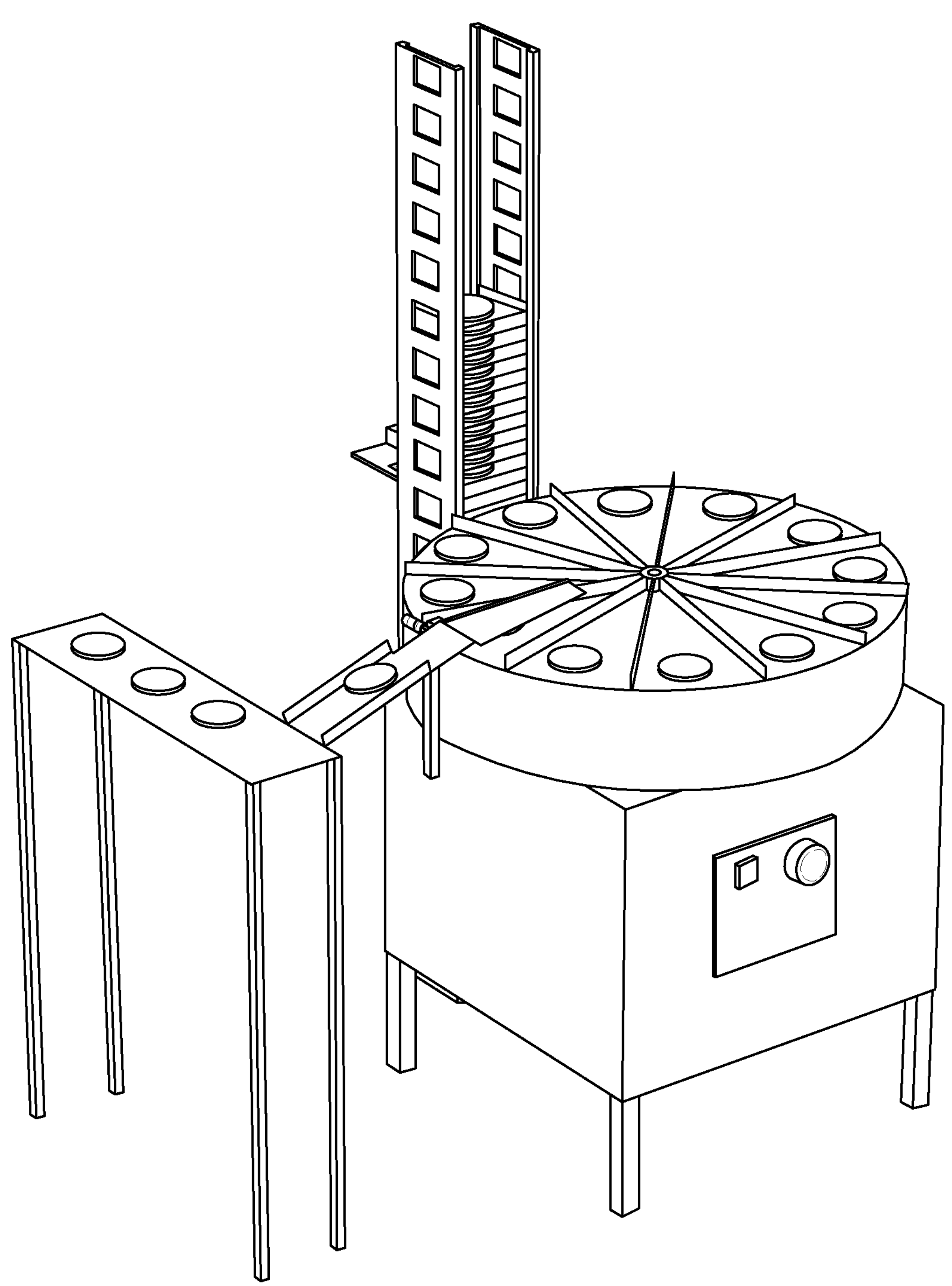
FIG. 1I illustrates a perspective view of an automated food patty cooking apparatus moving the patty from the chute slide to a conveyor or storage according to embodiments of the present invention disclosed herein.
Figure 2:
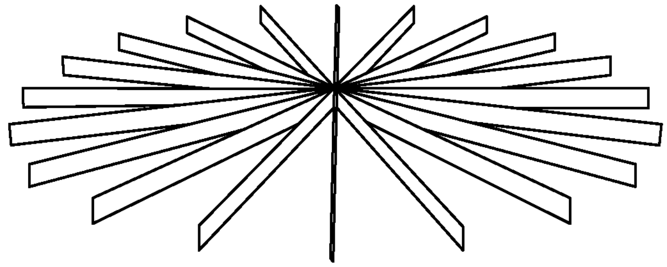
FIG. 2 illustrates a perspective view of dividers of the automated food patty cooking system, according to embodiments of the present invention disclosed herein.

Referring to FIG. 1E and FIG. 1F, after the patties have been rotated and scooched on one side, they are flipped over one by one using the flipper 108 that can be moved in either direction via an adjustable component. The dividers 120 assist in pushing the patties onto the flipper. The dividers 120 could also keep different types of patties from cross contaminating each other such as vegetarian and beef. In an embodiment of the present invention, the adjustable component may be associated with the chute slide 110 and the flipper 108. In a preferred embodiment of the present invention, the apparatus 100 is for automatically griddling hamburger/sandwich patties utilizing a heated rotating griddle along with a timed rotational cycle.

In an embodiment of the present invention, the dividers 120 may separate types of food keeping vegan options separate from beef and chicken, each having its own AI controlled heating element. In one of the preferred embodiment of the present invention, the dividers 120 may be removable for cleaning so that the griddle surface can be cleaned with a regular scraper just like a manually operated griddle.

Drippings and scrapings can go into the circular trays around the outside which can then be removed and put into a dishwasher or washed in a sink along with the other trays and the divider 120 component.

The divider 120 may be attached to a rotating axel at the center. At the extremity of each divider 120, they are held in place firmly by having a small protrusion at the end which fits into a corresponding notch in the griddle surface. This way the individual heating spaces are always centered in the middle of each divided space on the griddle and the dividers are held firmly in place. The removable divider element is key to the ease of maintenance because it is supposed to be a time saving system 100. In an embodiment of the present invention, the dividers 120 may be removable in nature to clean up the griddle surface.

According to embodiments of the present invention, the patty may be any meat, non-meat, frozen, thawed, and so forth.

The conveyor belt 112 may be extending from the food patty chute slide 110.

The apparatus 100 may also use artificial intelligence based on historical customer data and other factors to take care of fluctuating demand and supply variation. The apparatus 100 may predict high volume periods in order to increase delivery speed by thawing or cooking patties ahead of high-volume orders being placed using artificial intelligence based on historical customer data and other factors. The AI control module 136 can also be integrated into the inventory system of the restaurant and automatically order more ingredients when needed.

FIG. 3 illustrates a block diagram of an automated food patty cooking system, according to embodiments of the present invention. The apparatus 100 may be associated with a server 130 over a network 132. The AI control module 136 may be used to control a plurality of operations of the apparatus 100. The touch screen 118 may be associated with the AI control module 136 to control the apparatus 100 via a user-friendly graphical user interface. A processor 134 may process a plurality of parameters to control the apparatus 100.

The present invention has the same footprint as a standard commercial griddle, allowing the apparatus to be easily swapped in without the need for renovations and the use of more valuable kitchen space. It will be flush with the other kitchen appliances, such as ovens, and will fit beneath the existing hood fan. The cost of replacing a commercial hood fan with built-in fire extinguishers with a new custom-made hood fan is significant. Its utility is increased because it has a much lower initial cost, maintenance cost, and repair cost when compared to more complex robotic arm devices.

In an embodiment of the invention, the apparatus 100 may include an option for a conveyor belt that would have dispensers for buns and condiments with an automatic food wrapper at the end that wraps the food and prints a label with the customer order details including order number or customer name.

FIG. 4 illustrates a process 1100 for automatically cooking a plurality of patties, according to embodiments of the present invention.

At 1102, receiving an order placed by a customer on the user interface.

At 1104, pushing the switch on button 114 disposed on an outer surface of the apparatus.

At 1106, dispensing the patties onto the horizontal rotating griddle 104 between dividers 120 of the horizontal rotating griddle 104 for frying via the dispensing component 106.

At 1108, stacking the plurality of horizontal trays 106*a* on top of one another in the tower tray holder 122.

At 1110, moving the patties either up or down depending on which type of patty is requested in the tower tray holders 122 by using an AI control module 136.

At 1112, pushing each patty from horizontal tray 122 onto the horizontal rotating griddle 104 via the actuated push component 124.

At 1114, detecting temperature of the patties using temperature sensors which are linked to the artificial intelligence (AI) control module 136 to optimize rotational speed and a heating element's temperature.

At 1116, flipping each patty using the flipper 108 attached to the chute slide 110 and associated with the horizontal rotating griddle 104 that is capable of moving either direction.

At 1118, delivering the patty to the conveyor belt 112 via the chute slide 110, and then into a storage bin.

In an embodiment of the present invention, the process further comprises monitoring historical data and a plurality of factors using the artificial intelligence (AI) control module 136 to predict high volume times in order to increase delivery speed by cooking patties ahead of high-volume orders being placed.

While the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended invention. It is well within the scope of the invention to modify the automated food patty cooking apparatus 100 into an alternative embodiment where the horizontal rotating griddle 104 may be modified into a rotating grill for cooking patties over an open flame for extra flavors. The other features of the various embodiments of the invention would be the same as the automated food patty cooking apparatus with the griddle. The grilling bars would have to be perpendicular to the flipper and it would work as the automated food patty cooking apparatus in accordance with the teaching of the present invention.

This written description uses examples to disclose the invention, including the best mode, and also to enable any person skilled in the art to practice the invention, including making and using any devices or systems and performing any incorporated methods. The patentable scope of the invention is defined in the disclosure, and may include other examples that occur to those skilled in the art. Such other examples are intended to be within the scope of the invention if they have structural elements that do not differ from the literal language of the invention, or if they include equivalent structural elements within substantial differences from the literal language of the invention.

What is claimed is:

1. An automated food patty cooking system for uniformly cooking a plurality of patties, the system comprising:
- a housing including:
  - at least two buttons interposed on an outer surface of the housing;
- at least four supporting elements attached to the bottom of the housing;
- a griddle mounted on the housing for roasting the plurality of patties, the griddle includes a plurality of dividers;
- a dispensing component attached to the griddle for dispensing patties onto the griddle between the dividers of the griddle for frying, the dispensing component comprising:
  - a plurality of horizontal trays stacked on top of one another in a tower tray holder,
  - the tower tray holders adapted for moving patties either up or down depending on a type of patty that is desired;
- a flipper associated with the griddle for flipping each patty, the flipper is attached to a chute slide;
- a touch screen with a user-friendly graphical user interface for controlling the system using an artificial intelligence (AI) control module.

2. The system of claim 1, wherein the griddle being a horizontal rotating griddle that is configured to fry hamburger or sandwich patties.

3. The system of claim 1, wherein the at least two buttons comprise a switch on, a switch off button, or any foregoing combination thereof.

4. The system of claim 1, wherein at least four supporting elements are configured to provide support to the housing when the housing is placed on the ground.

5. The system of claim 1, wherein each of the horizontal trays are configured to hold one patty and move vertically up and down to dispense any type of patty.

6. The system of claim 1, wherein the artificial intelligence (AI) control module is configured to use historical data and a plurality of factors to predict high volume times in order to increase delivery speed by cooking patties ahead of high-volume orders being placed.

7. The system of claim 1, wherein the system further comprises infrared sensors to detect the final temperature of the patties.

8. The system of claim 1, wherein the system further comprises a temperature sensor linked to the artificial intelligence (AI) control module to optimize rotational speed and a heating element's temperature.

9. The system of claim 1, wherein the user interface receives data from online orders and immediately dispenses patties onto the griddle after a customer places an order.

10. The system of claim 1, wherein the griddle has a constant temperature throughout the cooking process.

11. The system of claim 1, wherein the griddle comprises a plurality of cooking stations with a heating element that is individually controlled by the artificial intelligence (AI) control module.

12. The system of claim 1, wherein the artificial intelligence (AI) control module is configured to store data related to which frying stations belongs to which food group.

13. The system of claim 1, wherein the artificial intelligence (AI) control module is configured to control the temperature and rotational speed of the griddle, a temperature of the patty dispensing tower tray holder, a temperature of each heating element, a flipping action, number of rotations required for each type of patty depending on size and composition, or any combination thereof.

14. The system of claim 1, wherein the dispensing component comprises an actuated push component for pushing each patty from a horizontal tray onto the griddle that moves in a circular motion with a timed rotational cycle.

15. The system of claim 1, wherein the each of the horizontal trays present in the tower tray holder have a heating element to accelerate thawing or cooking.

16. The system of claim 1, wherein the system comprises a scrubbing arm for cleaning an area of the griddle.

17. The system of claim 1, wherein a conveyor belt is associated with the chute slide and the conveyor belt extends into the enclosure from the food patty chute slide into a storage bin.

18. The system of claim 1, wherein the system comprises a rotating grill whose grilling bars being perpendicular to the flipper for cooking patties over an open flame for extra flavors.

19. The system of claim 1, wherein the dividers are removable divider components, each divider component comprise a heating element that is controlled via the AI controlled module.

20. The system of claim 19, wherein the dividers are attached to a rotating axel at center, each divider component have a small protrusion at the end of the divider which fits into a corresponding notch in a griddle surface of the griddle.

21. A food patty cooking apparatus for griddling hamburger or sandwich patties with a timed rotational cycle, the apparatus comprising:

- a housing having a switch on and a switch off button disposed on an outer surface of the housing;
- at least four supporting elements attached to the bottom of the housing, the supporting elements are configured to provide support to the housing when the housing is placed on the ground;
- a horizontal rotating griddle mounted on the housing for roasting the plurality of patties, the horizontal rotating griddle includes a plurality of dividers;
- a dispensing component attached to the griddle for dispensing patties onto the griddle between the dividers of the horizontal rotating griddle for frying, the dispensing component comprising:
  - a plurality of horizontal trays stacked on top of one another in a tower tray holder, the tower tray holders adapted for moving patties either up or down depending on which type of patty is requested; and
  - an actuated push component for pushing each patty from horizontal tray onto the horizontal rotating griddle;
- a flipper capable of moving either direction attached to a chute slide and associated with the horizontal rotating griddle for flipping each patty.

22. The apparatus of claim 21, wherein the apparatus comprises a touch screen with a user-friendly graphical user interface for controlling the apparatus.

23. The apparatus of claim 21, wherein the dividers are removable in nature to clean up the griddle surface.

24. A process for automatically cooking a plurality of patties using an apparatus, the process comprising:

- receiving an order placed by a customer on a user interface;
- pushing a switch on button disposed on an outer surface of the apparatus;
- dispensing the patties onto a horizontal rotating griddle between dividers of a horizontal rotating griddle for frying via a dispensing component;
- stacking a plurality of horizontal trays on top of one another in a tower tray holder;
- moving the patties either up or down depending on which type of patty is requested in the tower tray holders by using an AI control module;
- pushing each patty from horizontal tray onto the horizontal rotating griddle via an actuated push component;
- detecting temperature of the patties using temperature sensors which are linked to the artificial intelligence (AI) control module to optimize rotational speed and a heating element's temperature;
- flipping each patty using a flipper attached to a chute slide and associated with the horizontal rotating griddle that is capable of moving either direction; and
- delivering the patty to a conveyor belt via the chute slide, and then into a storage bin.

25. The process of claim 24, wherein the process comprising monitoring historical data and a plurality of factors using the artificial intelligence (AI) control module to predict high volume times in order to increase delivery speed by cooking patties ahead of high-volume orders being placed.

* * * * *